United States Patent
Shi et al.

(10) Patent No.: US 7,143,070 B2
(45) Date of Patent: Nov. 28, 2006

(54) CURRENT-MODE DIGITAL PROGRAMMABLE NEURAL FUZZY CLASSIFIER

(75) Inventors: Bingxue Shi, Beijing (CN); Guoxing Li, Beijing (CN)

(73) Assignee: Winbond Electronics, Corp., Hsinchu (TW)

( * ) Notice: Subject to any disclaimer, the term of this patent is extended or adjusted under 35 U.S.C. 154(b) by 757 days.

(21) Appl. No.: 10/139,729

(22) Filed: May 2, 2002

(65) Prior Publication Data

US 2003/0208452 A1 Nov. 6, 2003

(51) Int. Cl.
| | |
|---|---|
| G06F 15/18 | (2006.01) |
| G06E 1/00 | (2006.01) |
| G06E 3/00 | (2006.01) |
| G06G 7/00 | (2006.01) |
| G06J 1/00 | (2006.01) |
| G06N 3/06 | (2006.01) |
| G06N 3/063 | (2006.01) |

(52) U.S. Cl. ............... 706/2; 706/20; 706/33
(58) Field of Classification Search ............... 706/1, 706/2, 3, 4, 20, 33; 345/419; 382/133, 153, 382/195, 132, 239, 14; 327/355
See application file for complete search history.

(56) References Cited

U.S. PATENT DOCUMENTS 5,305,424 A * 4/1994 Ma et al. ............ 706/52
5,448,713 A * 9/1995 Hamamoto ............ 711/154

OTHER PUBLICATIONS

A Programmable Neural Fuzzy Processor for Handwritten igital Classification: Guoxing Li and Bingxue Shi, Apr. 2000, 0-7695-0619-4/00 $10.00 2000 IEEE.*
A Modified Current Mode Hamming Neural Network for Totally Unconstrained Handwritten Numeral Recognition: Li Guoxing, Shi Bingxue, Lu Wei, Jan. 1998, 0-7803-4859-1/98 $10.00 1998 IEEE.*
Automatic License No. Extraction and its Parallel Implementation: Opas Chutatape, Li Li, Qian Xiaodong, Mar. 1999, 0-7803-5735-3/99/$10.00 1999 IEEE.*
Synthesis of Current Mode Building Blocks for Fuzzy Logic Control Circuits: Marck J. Patyra, John E. Long, May 2, 1994, 1994 IEEE INternational Symposium, vol. 4, pp. 283-286.*

* cited by examiner

*Primary Examiner*—David Vincent
*Assistant Examiner*—Peter Coughlan
(74) *Attorney, Agent, or Firm*—J.C. Patents

(57) ABSTRACT

A neural fuzzy data classifier for handwritten character classification is provided. The classifier has an I/O circuit for inputting and outputting a plurality of membership functions. An input buffer receives a to-be-recognized character having a plurality of input features for generating a plurality of features values. A main computation unit comprising a computation array and a local thresholds block store the plurality of membership functions and receives the plurality of features values to generate a plurality of current-type weights. A difference circuit block compares the current output from the computation array and local thresholds lock. A plurality of switched-current integrators receives the plurality of current-type weights for generating a plurality of synthesis weights. A k-WTA circuit outputs the plurality of synthesis weights as well as the corresponding characters in an order of magnitude and the 10 current threshold block compares the plurality of synthesis weights and output a digital voltage.

7 Claims, 3 Drawing Sheets

CURRENT-MODE DIGITAL PROGRAMMABLE NEURAL FUZZY CLASSIFIER

BACKGROUND OF THE INVENTION

1. Field of the Invention

The present invention relates to a data classifier; and more particularly, to a data classifier using fuzzy logic and neural network.

2. Description of Related Art

The advancement of artificial intelligence (AI) has allowed consumers to enjoy electrical products such as robot dogs and personal digital assistants (PDAs) that have their own electronic brain. The electronic brain is formed by many different, smart, powerful, and learnable chips. In order for the electrical products to think and react like a human brain, the chips have to perform a huge amount of complex data calculation in high speed in order to achieve continuous motion and instant reactions.

The speed, size, and robustness of a data classifier are very important because they dictate the performance of the classifier. Non-parametric classification of data is certainly one of the main tasks that let us successfully compare artificial neural networks and fuzzy logic to the conventional methods. Therefore conventional methods require a great amount of computation time in performing relatively complex tasks such as character recognition.

Because of the fuzzy nature of human handwriting, it makes sense to adapt "fuzzy logic" into the data classifier. The "fuzzy logic" control theory is well known in the art of data processing. Rather than evaluating the two values "TRUE" and "FALSE" as in digital logic, fuzzy terms admit to degrees of membership in multiple sets so that fuzzy rules may have a continuous, rather than stepwise, range of truth of possibility. Therefore non-identical handwritten character from same or different users can be approximated using fuzzy logic for fast and robust handwriting recognition. The conventional method of fuzzy recognition relies upon the maximum membership principle. This conventional method is a single factor equation and can only recognize the handwritten character as a whole. Therefore the conventional method is very restricted in terms of speed, robustness, and accuracy.

Generally, analog fuzzy logic is constructed by multi-value logic circuit units, which may be of a voltage type or a current type. For conventional voltage type circuits, operational amplifiers are required for summation or subtraction operations to voltages, which makes the circuit complicated. On the contrary, the current type circuit is capable of proceeding summation and subtraction operations to currents and thus simplifies the circuit and is used in present invention. In addition, the operating speed of a current type circuit is generally higher than that of the voltage type circuit because the gain bandwidth of the operational amplifier restricts the operating speed of the voltage type circuit. Moreover, in a voltage type fuzzy logic circuit, switch capacitors are usually required, which increases the size of a chip for the circuit because a large chip area is required to fabricate a capacitor. The use of switch capacitors also increases the complexity of manufacturing a chip for the circuit as two polysilicon layers are required for fabricating a switch capacitor. The fabrication of a current switch for the current type fuzzy logic can be done by standard digital CMOS technology and thus reduce the complexity of manufacturing a chip for the circuit. Accordingly, the present invention provides a switch current type fuzzy processor for high-speed character recognition.

As a consequence, a high-speed and robust VLSI parallel computation is required to process to complex data such as character recognition. The classifier needs to able to realize different transfer or membership functions such as multiplier, sum, nonlinear, minimum and maximum functions. The input and final output signals of the classifier are digital but the processing and transmitting signals are analog current signals to stimulate high-speed real-time signal processing. The function generator takes digital input from the input buffer and I/O circuit and converts the digital input signals to positive current output and negative current output. The weights of the computation are programmable and the structure of the network is reconfigurable, and so this network can work in multiple-chip mode or can be cascaded in parallel or series to form a large scale network. The programmability and expandability of the classifier is crucial to a high-speed and robust classification of complex data.

SUMMARY OF THE INVENTION

It is an object of the present invention to provide a digital programmable data classifier using neural network and fuzzy logic to recognize characters with powerful data classification.

It is an object of the present invention to provide a data classifier that has the properties of parallelism, high-speed, and robustness.

It is an object of the present invention to have a smart structure that allows weight programmability and structure reconfigurability such as a single layer binary output perceptron or fuzzy inference based on the form of SUM-MAX.

It is a further object of the present invention to provide a classifier capable of forming a large scale network in various configurations by cascading the chips in parallel or in series such as a multilayer perceptron (MLP)-like or multilayer fuzzy inference.

It is a further object of the present invention to provide a MLP-like neural structure in which the back-propagation (BP) learning algorithm is used to train the weights, where the gain factor $\beta$ in the sigmoid function is set to a relatively large value. Furthermore in a single layer binary output perception neural classifier, the least mean square (LMS) algorithm is used train the weights.

It is a further object of the present invention to provide a current-type data classifier that is efficient, low cost, and easy to fabricate in VLSI.

In order to achieve these and other objects, the present invention provides a data classifier comprising an input buffer, a column decoder, an I/O circuit, a function generator, and a comparing circuit. The function generator comprises a 10×11 weight computation array which includes 1×10 local threshold units, 10 different circuits, and 20 switched-current (SI) integrators. The comparing circuit comprises a k-WTA circuit and 10 current threshold units.

According to the present invention, the data classifier uses fuzzy logic and neural network to determine the optimum character candidate from a library of predetermined sets of character sequences. Specifically, the handwriting recognition of the present invention uses a two dimensional synthetic membership function in order to classify the extracted features of a scanned character image. The synthetic membership function represents a degree of an input character belonging to an object class as a whole in terms of different features. A "feature" is defined as a basic component of a handwritten character such as a dot, a curve, a line such that a handwritten character is composed of a combination of features or feature groups. The weighted sum synthetic membership function has better generalization ability since it can reinforce the contribution of different feature groups to different classes. As a result, the membership function is much faster and more robust by recognizing the features and feature groups of a scanned image. When the membership function is combined with the maximum membership principle, it can give the final recognizing results. The present invention uses genetic learning algorithm to train the membership function using fuzzy logic because of simplicity over LMS and BP learning algorithm, where the classifier is trained off-chip to reduce the complexity of the chip.

In accordance to the preferred embodiment, a neural fuzzy data classifier for handwritten character classification is provided. The classifier has an I/O circuit for inputting and outputting a plurality of membership functions. An input buffer receives a to-be-recognized character having a plurality of input features for generating a plurality of features values. A main computation unit comprising a computation array and a local thresholds block store the plurality of membership functions and receives the plurality of features values to generate a plurality of current-type weights. A difference circuit block compares the current output from the computation array and local thresholds lock. A plurality of switched-current integrators receives the plurality of current-type weights for generating a plurality of synthesis weights. A k-WTA circuit outputs the plurality of synthesis weights as well as the corresponding characters in an order of magnitude and the 10 current threshold block compares the plurality of synthesis weights and output a digital voltage.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION OF THE PREFERRED EMBODIMENTS

Figure 1:
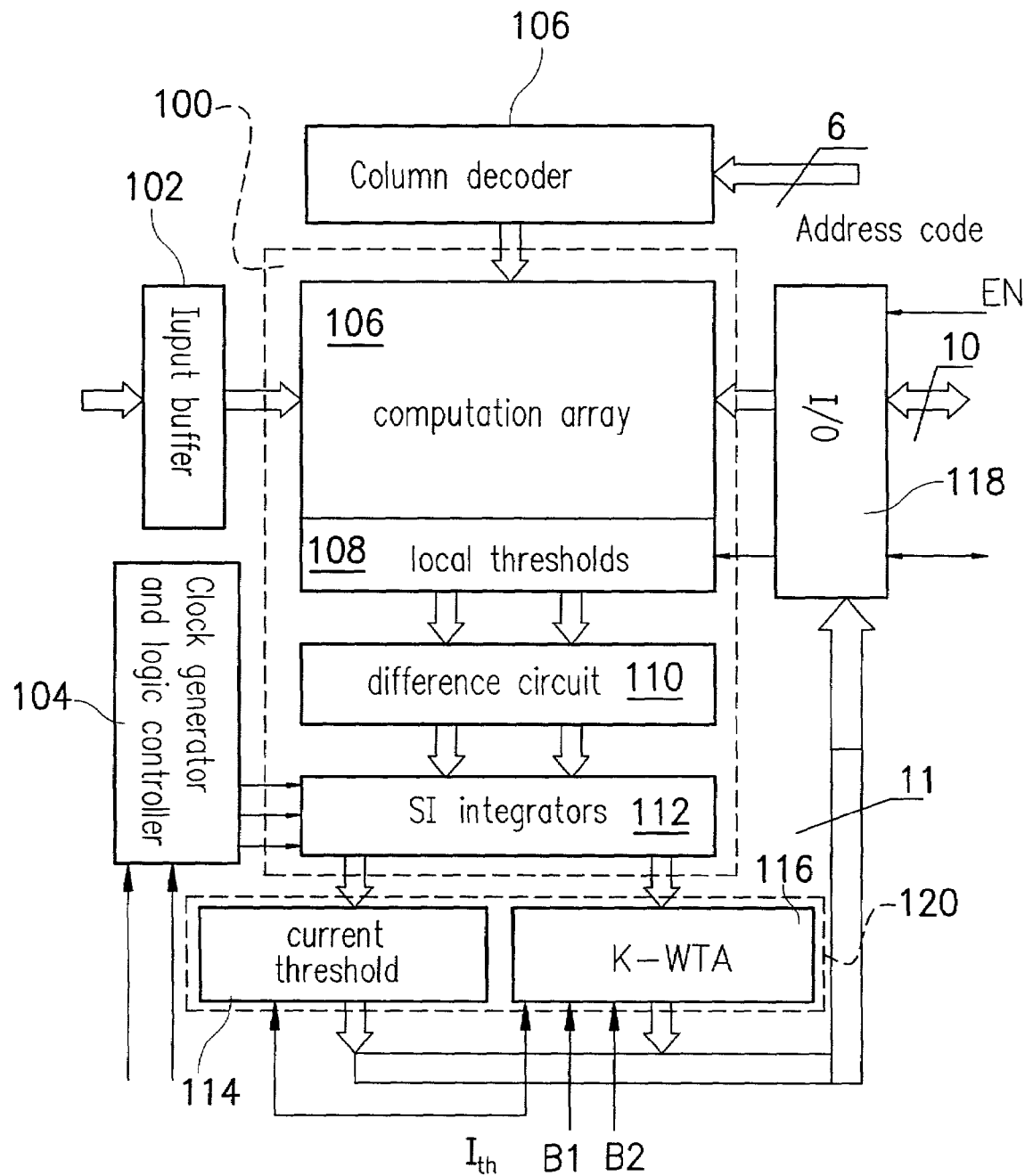
FIG. 1 is a schematic diagram of the structure of the classifier according to the preferred embodiment of the present invention.

Please refer to FIG. 1, the structure of the neural fuzzy classifier of the present invention for handwriting recognition is illustrated, which comprises an input buffer 102, a clock generator and logic controller 104, a column decoder 106, an I/O circuit 118, a function generator 100, and a comparing circuit 120. The function generator 1100 comprises a 10×10 computation array 106, a 10-local-thresholds block 108, a 10-difference circuit block, and a 10-SI-integrators block. The comparing circuit 120 comprises a 11-port k-WTA circuit and a 10-current-thresholds block. In the function generator 1100, the weights (or membership) function used is shown in equation (1):

$$PS_j = \sum_{i=0}^{9} \overline{Fi \oplus D3ij} \left( \sum_{k=0}^{2} 2^k D_{kij} I_{ref} \right) + D_{3tj} \sum_{k=0}^{2} 2^k D_{kij} I_{ref}$$

for $j = 0, 1, \Lambda, 9$ $$NS_j = \sum_{i=0}^{9} Fi \oplus D3ij \left( \sum_{k=0}^{2} 2^k D_{kij} I_{ref} \right) + (1 - D_{3tj}) \sum_{k=0}^{2} 2^k D_{kij} I_{ref}$$

for $j = 0, 1, \Lambda, 9$

Where $PS_j$ is a positive current output and $NS_j$ is a negative current output in the $j^{th}$ column, $D_{kij}$ (k=0, 1, 2, 3)∈[0, 1] is the control code of the weights in $i^{th}$ row $j^{th}$ column, $D_{ktj}$ is the control code of local threshold generating unit, and $I_{ref}$ is the reference current which is 3 μA in the preferred embodiment. The logic operations of the classifier are controlled by a number of non-overlapping clock signals ck1 and ck2 by the clock generator and logic controller 104.

To recognize a pattern, its corresponding m features are input to the input buffer 102. To program the classifier, EN is set active to enable the I/O circuit 118 for data exchange. Under the control of the $D_{kij}$ signal, the output of the input buffer 102, and the timing signals, the membership functions of the standard pattern can be written into the membership function memory units. To recognize a pattern, EN is set inactive to disable the I/O circuit 118, and the features of a to-be-recognized pattern are inputted and decoded by the feature decoder 102 to select the corresponding membership function memory units. The currents representing membership degrees corresponding to n (n=11 for example) standard patterns for each feature are then obtained by the computation array. The 10 SI integrators 112 accumulate the membership degrees for all features in a time-shared way to obtain the weights corresponding to the n standard patterns. Finally, a comparing circuit 120 is provided to output the weights as well as the corresponding standard patterns in an order of magnitude as a recognition result.

The main computation unit comprises a 10×10 computation array 106 and a 1×10 local-thresholds unit 108. The weights in the computation array 106 are digitally programmable, and their control codes are stored in off-chip EPROM memory units through the I/O circuit 118. The 1×10 local thresholds 108 output reject signals by calculating the local threshold of the membership functions. The computation unit receives 10 feature codes from the input buffer in one cycle to generate 20 part sum currents by computation. The 10-difference circuits receive the 10 part sum currents to output 20 difference currents in which 10 are zero. The 20 SI integrators accumulate these different currents in each cycle, and after several cycles depending on the number of bits of the input character the total sum of currents that represent the character are collected. After each cycle, the weights in the computation array 106 are refreshed from off-chip EPROM so a new set of 10 feature codes can be sent to the computation array.

The I/O circuit 118, the input buffer 102, and the clock generator and logic controller in FIG. 1 can be implemented by well known digital circuits and therefore will not be described.

Figure 2:
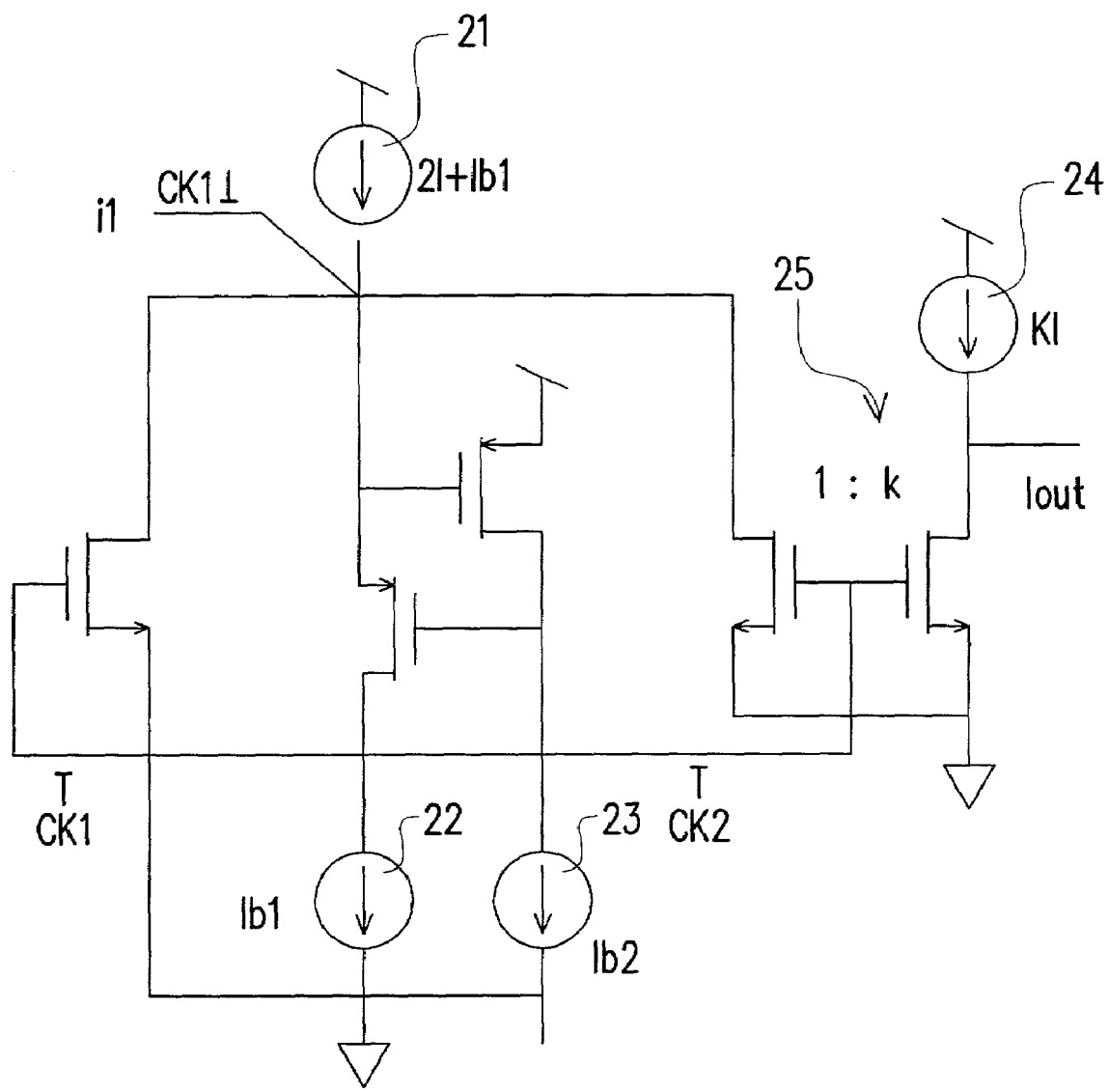
FIG. 2 is a circuit diagram of the SI integrator according to the preferred embodiment of the present invention.

FIG. 2 shows the shared RGC SI integrator of the classifier. An input current $i_1$ is joined by a current source 21 of 21+lb1 and is controlled by the CK1 signal. Furthermore two current sources 22, 23 of lb1 and lb2 are connected to the current mirror 25 with a ratio of 1:k. A current source 24 of k1 is connected to $i_{out}$ of the SI integrator. The SI integrator 112 performs an accumulation operation on the current-type values of weighted membership degrees to obtain the current-type value of a synthesis membership. The SI integrator 112 is implemented by a switched-current technique which introduces the second generation switched-current storage to overcome disadvantages of the first generation switched-current storage. To stabilize the drain voltage of a storage transistor, a RGC (Regulated-Gate Cascode) structure is adopted to construct a storage unit. Although the fully differential integrator can be adopted in this classifying system, the single ended RGC integrator is preferably used because of its simplicity. The SI integrator 112 accumulates the input current one by one in each cycle. Timing controls of the switches are controlled by two non-overlapped clocks CK1 and CK2 shown in FIG. 4. In the CK1 clock cycle an input current $i_1$ is sent to the integrator, and in CK2 clock cycle the output current $I_{out}$ is generated. The switched-current integrator 112 will accumulate all the weighted part-sum currents in every clock cycle and the total weighted sum currents are obtained and outputted to the 11-port k-WTA circuit 116 and 10-current-thresholds unit 114 after several CK1 clock cycles.

Figure 3:
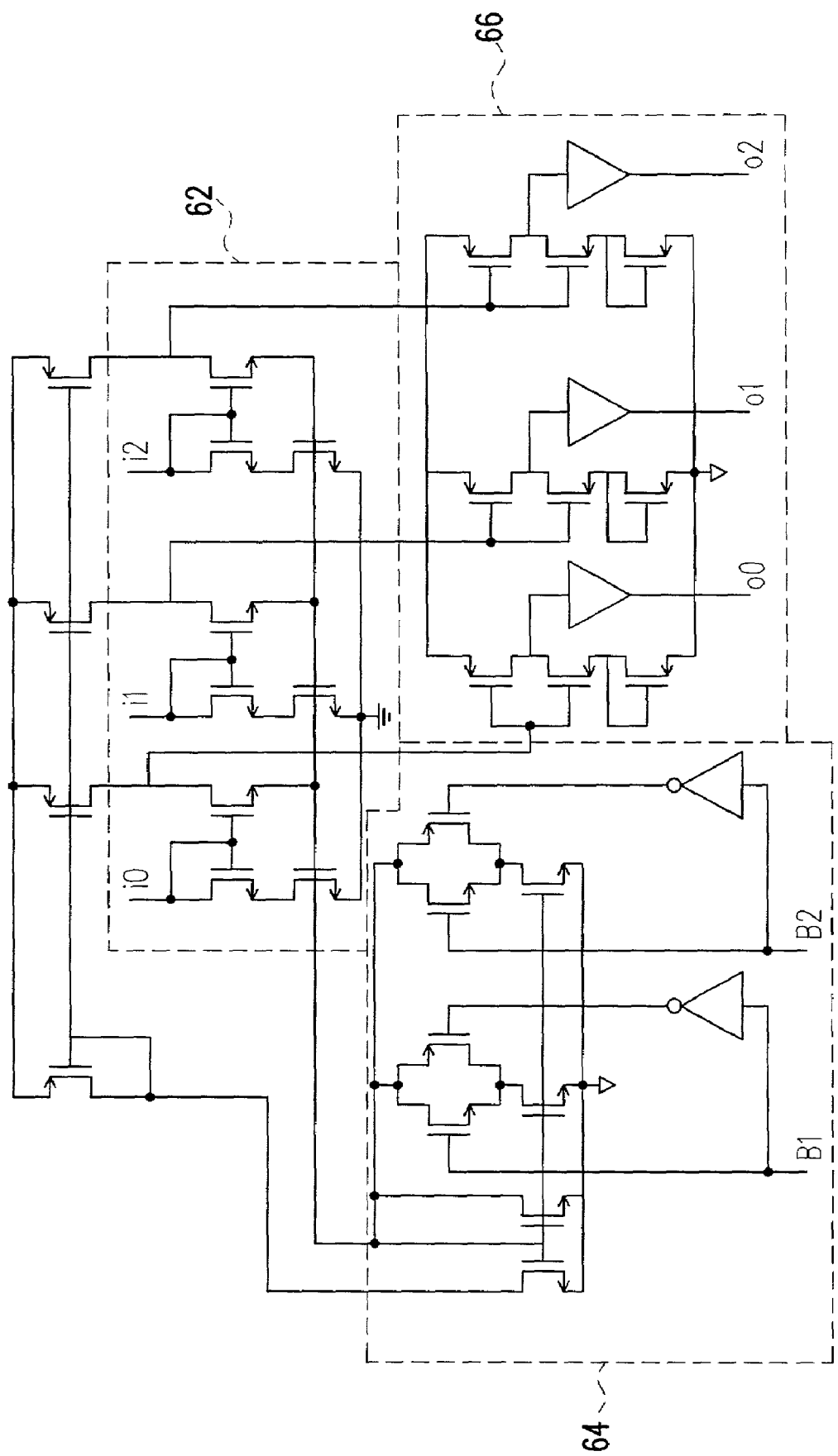
FIG. 3 is a circuit diagram of the k-WTA circuit according to the preferred embodiment of the present invention.

FIG. 3 shows the 11-port k-WTA circuit 116 comprising a circuit unit A 62, a circuit unit B 64, and a circuit unit C 66. The weights comparing circuit 120 is used to compare and sort the currents corresponding to the weights of the N standard characters and the to-be-recognized character to sequentially output high voltage pulses on the outputs corresponding to the N standard character in order of magnitude of the current as a recognition result. If the classifier is used in parallel or cascade to improve system performance, the k-WTA circuit must be expanded in order to compare and sort M number of classifiers times N standard characters. Therefore the circuit unit A is easily expandable to a larger network depending on its application. All transistors work in strong inversion therefore the WTA network is high speed. The circuit unit A 62 comprises three identical input units where $i_0$, $i_1$, and $i_2$ designate three input currents representing three weights which are directed and output to the circuit unit C 66. The k-WTA circuit 116 receives the input currents to find the maximum among them and output three voltage signals indicating the maximum one. A number of control logic signals B1 and B2 are sent to the circuit unit A for enabling the individual maximum-finding circuit by a 'high' signal. A voltage $V_b$ is applied to circuit unit A so a current is flown through the differential transistors having the maximum input voltage and produce a drain current $I_i$ when the drain current of other differential transistors are zero. The circuit unit B is an output circuit of the k-WTA network. The clock cycle CK1 and CK2 controls the current source of the diodes and the final output $I_o$ of the 11-port k-WTA circuit 17 is passed through a 1:1 current mirror. The k-WTA selects largest k value of each group of feature codes at one time from k classes with a simple set of complementary features. If signals B1 and B2 are zero voltage levels, the value of k is 1 so the WTA is reconfigured as 1-WTA. When any one of the B1 or B2 is high voltage level, the value of k becomes 2 so the WTA becomes 2-WTA. The current mode k-WTA is designed to match the SI integrator of the previous stage. This k-WTA can be reconfigured to 1-WTA, 2-WTA, 3-WTA by changing control codes B1 and B2. The complexity of the k-WTA circuit is O(n) and one input can be regarded as a threshold input.

There are 10 current threshold units in the current threshold 114 and they work as nonlinear transferring functions in parallel. When two input currents are sent to the current threshold 114, a digital level of voltage of either 0 or 1 is generated according to the value of the two currents. In the preferred embodiment, an additional port is inserted in the current threshold unit to provide a term of threshold as expressed by the following equation (2):

$$Y_j = F\left(\sum_i^N W_{ij} X_i + TH\right)$$

where N is the length of input feature vector and TH is the threshold current. Only one of the current threshold block or k-WTA circuit is active in one time according to different configurations of the classifier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital programmable neural fuzzy classifier adapted to be fabricated in a VLSI chip, comprising:
    an input buffer for receiving a to-be-recognized image having a plurality of input features to generate a plurality of feature values;
    a computation array for storing a plurality of membership functions and receiving the plurality of feature values to generate a plurality of current-type weights for the plurality of input features;
    a local threshold block for generating a plurality of local threshold currents for the plurality of feature values;
    a difference circuit for differentiating the plurality of current-type weights and the local threshold currents to output a plurality of differentiated current-type weights;
    a plurality of switched-current integrator corresponding to the computation array for receiving the plurality of differentiated current-type weights to generate a plurality of current-type synthesis weights;
    a k-winner-take-all circuit for receiving the plurality of current-type synthesis weights from the plurality of switched-current integrators and outputting a plurality of weights in order of magnitude;
    a current threshold block for receiving the plurality of current-type synthesis weights from the plurality of switched-current integrators and comparing the current-type synthesis weights to output a plurality of digital voltage levels;
    an I/O circuit for inputting programming codes to the computation array from off-chip memory units and receiving the plurality of weights in order of magnitude and the plurality of digital voltage levels to output a final recognizing result of the to-be-recognized image; and
    a clock generator and logic controller for generating clock cycle and logic signals for controlling timing and logic operations of the plurality of switched-current integrators and the k-winner-take-all circuit.

2. The classifier in claim 1, wherein the I/O circuit and the k-winner-take-all circuit have 11 corresponding ports.

3. The classifier in claim 1, wherein the computation array is 10×10.

4. The classifier in claim 3, wherein the local threshold block is 1×10.

5. The classifier in claim 3, wherein the number of switched-current integrators includes 10.

6. The classifier in claim 5, wherein each of the plurality of switched-current integrators includes a plurality of storage units constructed by a Regulated-Gate Cascade structure.

7. The classifier in claim 5, wherein a mirror current in each of the switched-current integrator has an aspect ratio of 1:k.

* * * * *